(12) United States Patent
Lee et al.

(10) Patent No.: US 9,864,446 B2
(45) Date of Patent: Jan. 9, 2018

(54) TOUCH SCREEN-INTEGRATED DISPLAY DEVICE

(71) Applicant: LG DISPLAY CO., LTD., Seoul (KR)

(72) Inventors: Euijun Lee, Seoul (KR); JeongKweon Park, Paju-si (KR); SangHyun Kwon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 5 days.

(21) Appl. No.: 14/749,322

(22) Filed: Jun. 24, 2015

(65) Prior Publication Data

US 2016/0188059 A1 Jun. 30, 2016

(30) Foreign Application Priority Data

Dec. 31, 2014 (KR) .......................... 10-2014-0195319

(51) Int. Cl.
*G06F 3/041* (2006.01)

(52) U.S. Cl.
CPC .......... *G06F 3/0412* (2013.01); *G06F 3/0416* (2013.01)

(58) Field of Classification Search
None
See application file for complete search history.

(56) References Cited

U.S. PATENT DOCUMENTS

2015/0130726 A1* 5/2015 Min ..................... G06F 3/0412
345/173

* cited by examiner

*Primary Examiner* — Kenneth B Lee, Jr.
(74) *Attorney, Agent, or Firm* — Dentons US LLP

(57) ABSTRACT

Disclosed is a single flexible member that electrically connects a display panel and a touch panel to an external circuit. The flexible member comprises: a first connecting portion located at a first surface of the flexible member, having a display pad connecting unit configured to connect with a displaying element in the display panel, and a touch pad connecting unit configured to connect with a touch sensing element in the touch panel; a second connecting portion located at a second surface of the flexible member opposite to the first connecting portion, having a single connector configured to connect with the external circuit to control at least one of the displaying element and the touch sensing element; and a touch integrated circuit on the second surface of the flexible member, wherein the touch integrated circuit transmit a driving signal to the touch sensing element.

20 Claims, 12 Drawing Sheets

TOUCH SCREEN-INTEGRATED DISPLAY DEVICE

CROSS-REFERENCE TO RELATED APPLICATIONS

This application claims the priority of Korean Patent Application No. 10-2014-0195319 filed on Dec. 31, 2014, in the Korean Intellectual Property Office, the disclosure of which is incorporated herein by reference for all purposes.

BACKGROUND OF THE INVENTION

Field of the Invention

The present invention relates to a touch screen-integrated display device. More particularly, the present invention relates to a touch screen-integrated display device in which a flexible printed circuit board is connected with an entirety of a first pad connected with a display device and a second pad connected with a touch sensing device.

Description of the Related Art

A touch screen panel is a device configured to sense a user's touch input such as a screen touch or gesture with respect to a display device. The touch screen has been widely used for portable display devices such as a smart phone, and a tablet PC and large-sized display devices such as display devices in public facilities and smart TVs.

In a general display device, a touch screen panel is attached to an upper substrate. Usually, the touch screen panel is separately manufactured and attached to an external surface of the display device. Thus, a total thickness of the display device is undesirably large.

In recent years, in order to solve such problem, a so-called in-cell type touch screen-integrated display device that is manufactured by integrating a touch screen panel into a display panel has been developed.

FIG. 1A is a schematic perspective view provided to describe a touch screen-integrated display device of the related art. FIG. 1B is a schematic cross-sectional view provided to describe the touch screen-integrated display device taken along a line Ib-Ib' of FIG. 1A. FIG. 1C is a schematic cross-sectional view provided to describe the touch screen-integrated display device taken along a line Ic-Ic' of FIG. 1A.

Referring to FIG. 1A to FIG. 1C, the touch screen-integrated display device 100 may include a lower substrate 110, a first pad 111, a second pad 112, an upper substrate 120, a display element 130, a touch sensing element 140, a bonding layer 150, a driver integrated circuit 160, a first flexible printed circuit board 170, and a second flexible printed circuit board 190.

In an area of the lower substrate 110 which is not covered by the upper substrate 120 but exposed, a first pad area PA1 and a second pad area PA2 are disposed. In the first pad area PA1, the first pad 111 that provides electrical connection with the display element 130 is disposed, whereas in the second pad area PA2, the second pad 112 that provides electrical connection with the touch sensing element 140 is disposed.

An external printed circuit board, in which a timing controller, a touch integrated circuit, or the like are disposed, can be connected to the first pad 111 and the second pad 112 via the first flexible printed circuit board 170 and the second flexible printed circuit board 190. Namely, in order to connect the external printed circuit board with the first pad 111, the first flexible printed circuit board 170 is used. Also, in order to connect the external printed circuit board with the second pad 112, the second flexible printed circuit board 190 is used. In order to connect the external printed circuit board with the first flexible printed circuit board 170 and the second flexible printed circuit board 190, respective connectors 175 and 195 are used.

If a touch screen panel and a display panel are separate and non-integrated, separate flexible printed circuit boards that are connected with the touch screen panel and the display panel are needed to connect with each of the touch screen panel and the display panel with an external printed circuit board.

SUMMARY OF THE INVENTION

The inventors of the present invention found that if a better structured and designed single flexible printed circuit board is connected to both the first pad and also the second pad of a lower substrate, manufacturing costs for the touch screen-integrated display device can be reduced and the assembly process can be simplified.

Accordingly, an advantage of the present invention is to provide a touch screen-integrated display device in which a first pad and a second pad can be simply connected with a single external printed circuit board.

Another advantage of the present invention is to provide a touch screen-integrated display device of which a flexible printed circuit board can be rapidly attached to an external printed circuit board.

Yet another advantage of the present invention is to provide a touch screen-integrated display device for which manufacturing costs and processing time can be reduced.

The advantages of the present invention are not limited to the aforementioned advantages, these and other advantages, which are not mentioned above, will be apparent to a person having ordinary skill in the art from the following description.

According to still another feature of the present invention, the touch integrated circuit may be disposed on the flexible printed circuit board.

Details of other exemplary embodiments will be included in the detailed description of the invention and the accompanying drawings.

The present invention has an effect of rapidly and easily connecting an external printed circuit board with pads in an exposure area of a lower substrate.

The present invention has an effect of reducing costs required for a flexible printed circuit board when a touch screen-integrated display device is manufactured.

The present invention has an effect of providing a flexible printed circuit board that is suitable for a touch screen-integrated display device.

The effects of the present invention are not limited to the aforementioned effects, and other various effects are included in the present specification.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE ILLUSTRATED EMBODIMENTS

Figure 1A:
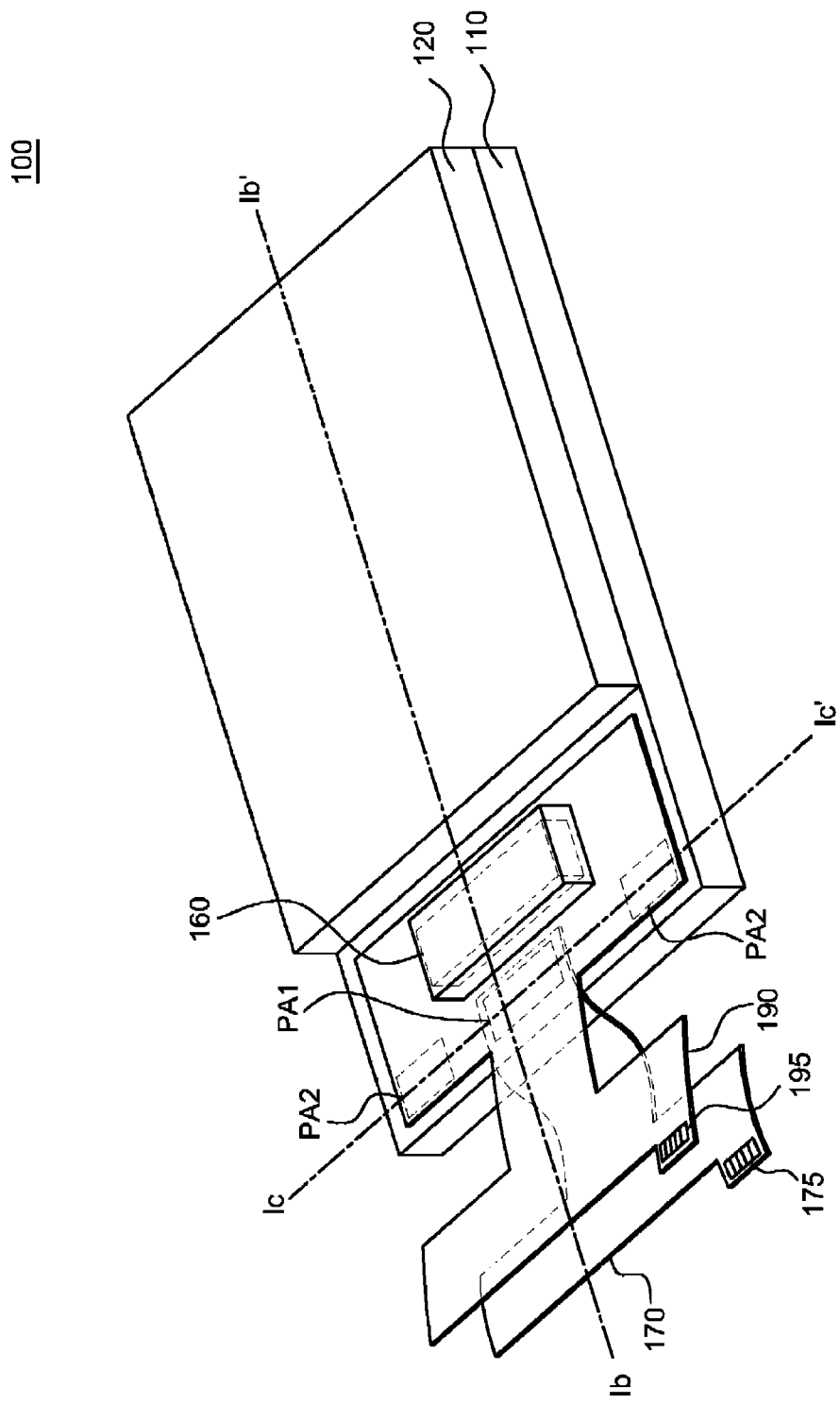
FIG. 1A is a schematic perspective view of the related art provided to describe a touch screen-integrated display device.
Figure 1B:
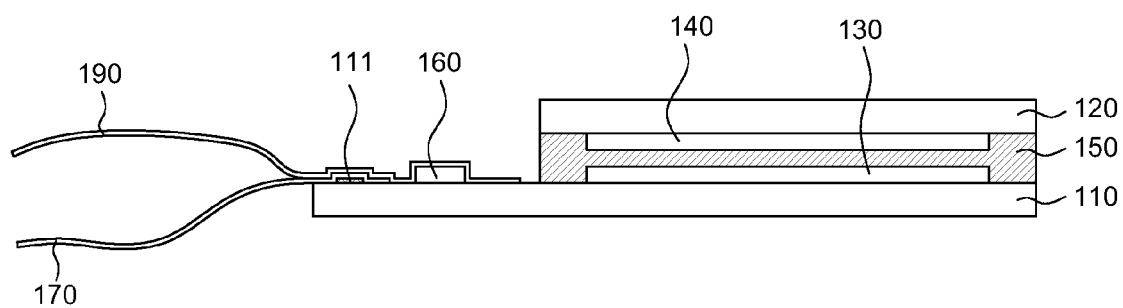
FIG. 1B is a schematic cross-sectional view of the related art provided to describe the touch screen-integrated display device taken along a line Ib-Ib' of FIG. 1A.
Figure 1C:
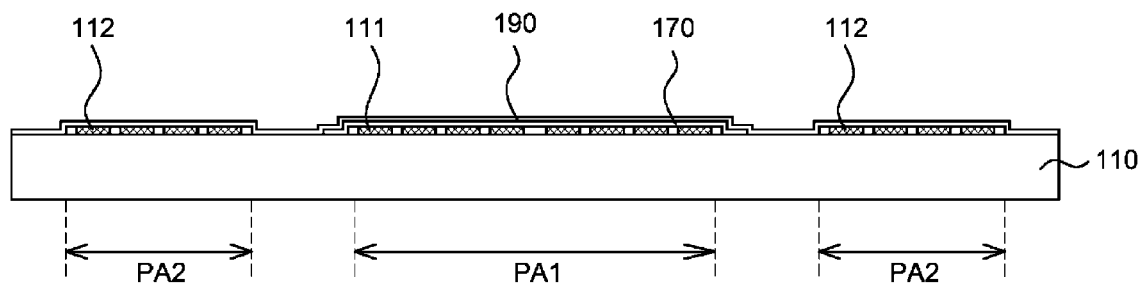
FIG. 1C is a schematic cross-sectional view of the related art provided to describe the touch screen-integrated display device taken along a line Ic-Ic' of FIG. 1A.

Advantages and features of the present invention, and methods for accomplishing the same will be more clearly understood from exemplary embodiments described below with reference to the accompanying drawings. However, the present invention is not limited to the following exemplary embodiments but may be implemented in various different forms. The exemplary embodiments are provided only to complete the disclosure of the present invention and to fully provide a technical description to a person having ordinary skill in the art to which the present invention pertains, and the present invention will be defined by the appended claims.

The shapes, sizes, ratios, angles, numbers, and the like illustrated in the accompanying drawings for describing the exemplary embodiments of the present invention are merely examples, and the present invention is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular element may include plural element unless expressly stated otherwise.

Components are interpreted to include margins of error or to be within a range of ordinary manufacturing tolerance even if not expressly stated.

When the positional relationship between two parts is described using the terms such as "on", "above", "below", and "next", one or more parts may be positioned between the two parts unless the terms are used with the term "immediately" or "directly" is not used.

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be the same or different from a second component depending upon the technical concepts of the present invention.

Throughout the whole specification, the same reference numerals denote the same elements.

Since size, thickness and other graphical characteristics of each component illustrated in the drawings are represented for convenience of explanation, the present invention is not necessarily limited to the illustrated details of each component.

The features of various embodiments of the present invention can be partially or entirely combined with each other and can be interlocked and operated in technically various ways as can be fully understood by a person having ordinary skill in the art, and the embodiments can be carried out independently of or in association with each other.

Various exemplary embodiments of the present invention will be described in detail with reference to the accompanying drawings.

Figure 2A:
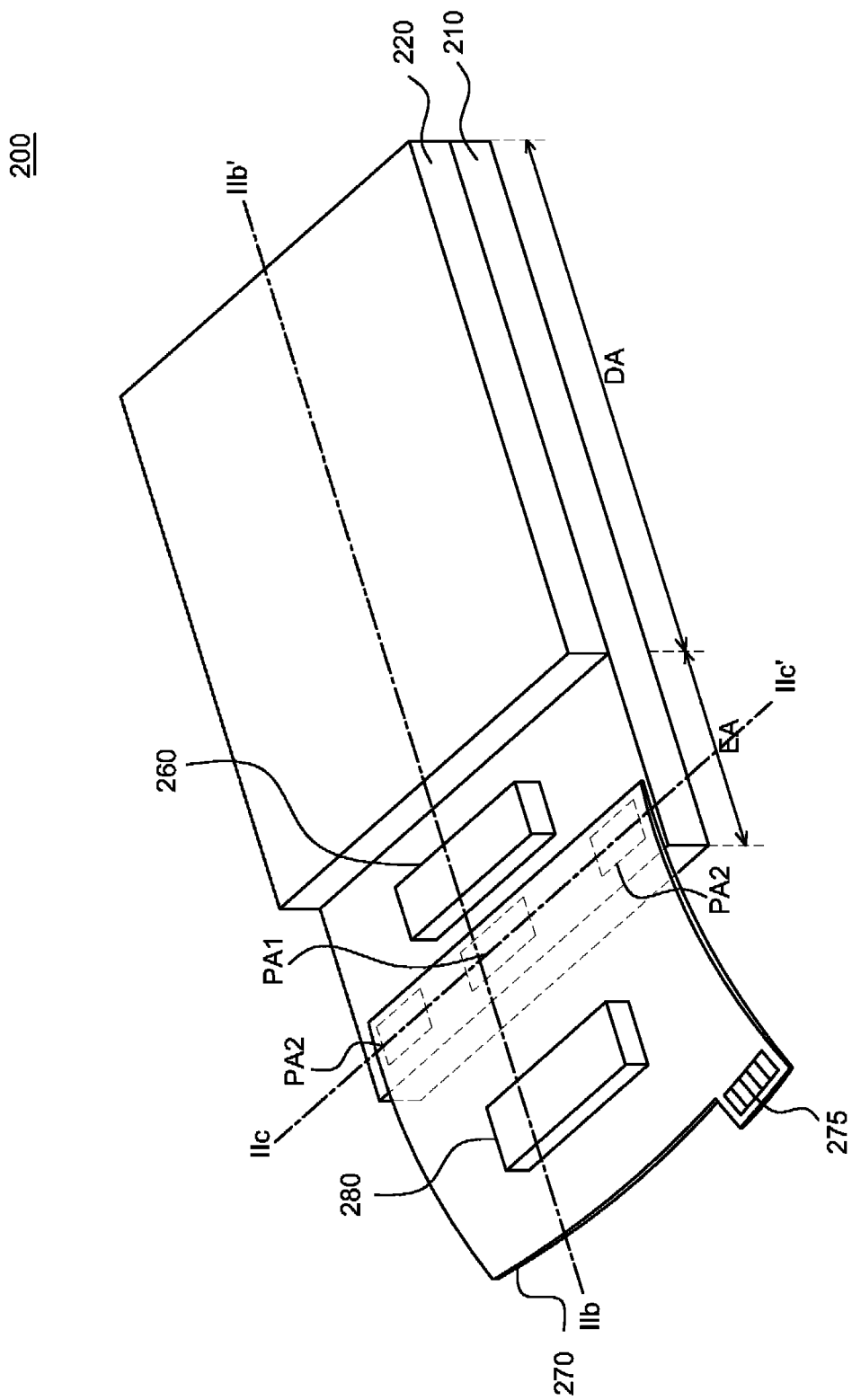
FIG. 2A is a schematic perspective view provided to describe a touch screen-integrated display device according to an exemplary embodiment of the present invention.
Figure 2B:
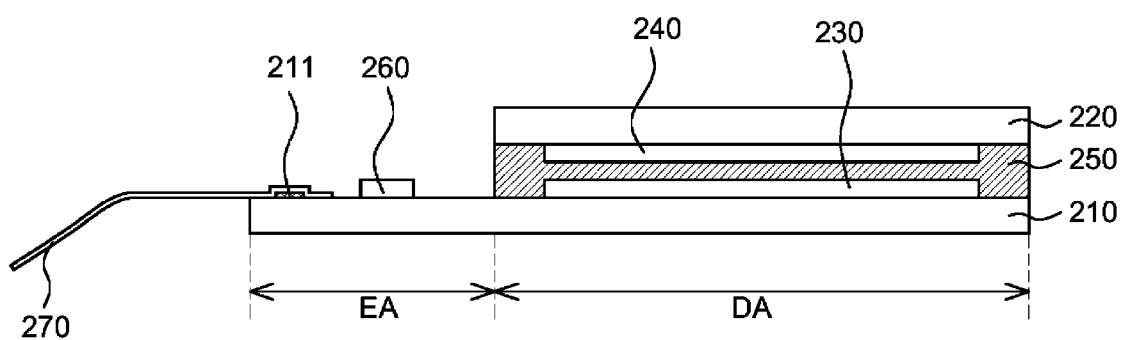
FIG. 2B is a schematic cross-sectional view provided to describe the touch screen-integrated display device taken along a line IIb-IIb' of FIG. 2A according to an exemplary embodiment of the present invention.
Figure 2C:
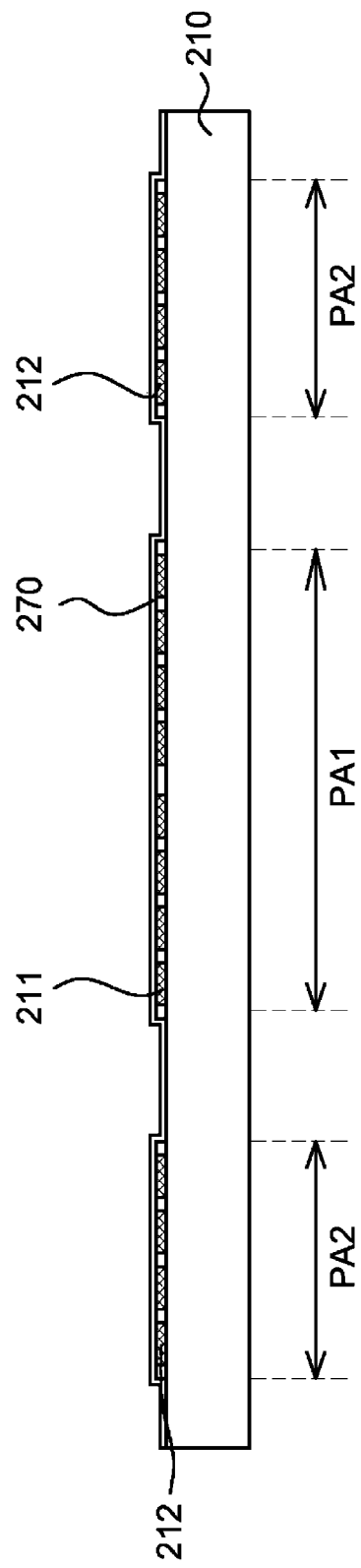
FIG. 2C is a schematic cross-sectional view provided to describe the touch screen-integrated display device taken along a line IIc-IIc' of FIG. 2A according to an exemplary embodiment of the present invention.

FIG. 2A is a schematic perspective view provided to describe a touch screen-integrated display device according to an exemplary embodiment of the present invention. FIG. 2B is a schematic cross-sectional view provided to describe the touch screen-integrated display device taken along a line IIb-IIb' of FIG. 2A according to an exemplary embodiment of the present invention. FIG. 2C is a schematic cross-sectional view provided to describe the touch screen-integrated display device taken along a line IIc-IIc' of FIG. 2A according to an exemplary embodiment of the present invention.

Referring to FIG. 2A to FIG. 2C, a touch screen-integrated display device 200 according to an exemplary embodiment of the present invention includes a lower substrate 210, a first pad 211, a second pad 212, an upper substrate 220, a display element 230, a touch sensing element 240, a bonding layer 250, a driver integrated circuit 260, a flexible printed circuit board (FPCB) 270, and a touch integrated circuit 280.

The lower substrate 210 is configured to accommodate or support various components of the touch screen-integrated display device 200 and can be made of an insulating material such as glass. Also, the lower substrate 210 may be made of a flexible material, for example, plastic such as polyimide. Since the lower substrate 210 is made of a flexible material, a back plate for supporting the lower substrate 210 may be used.

Figure 2D:
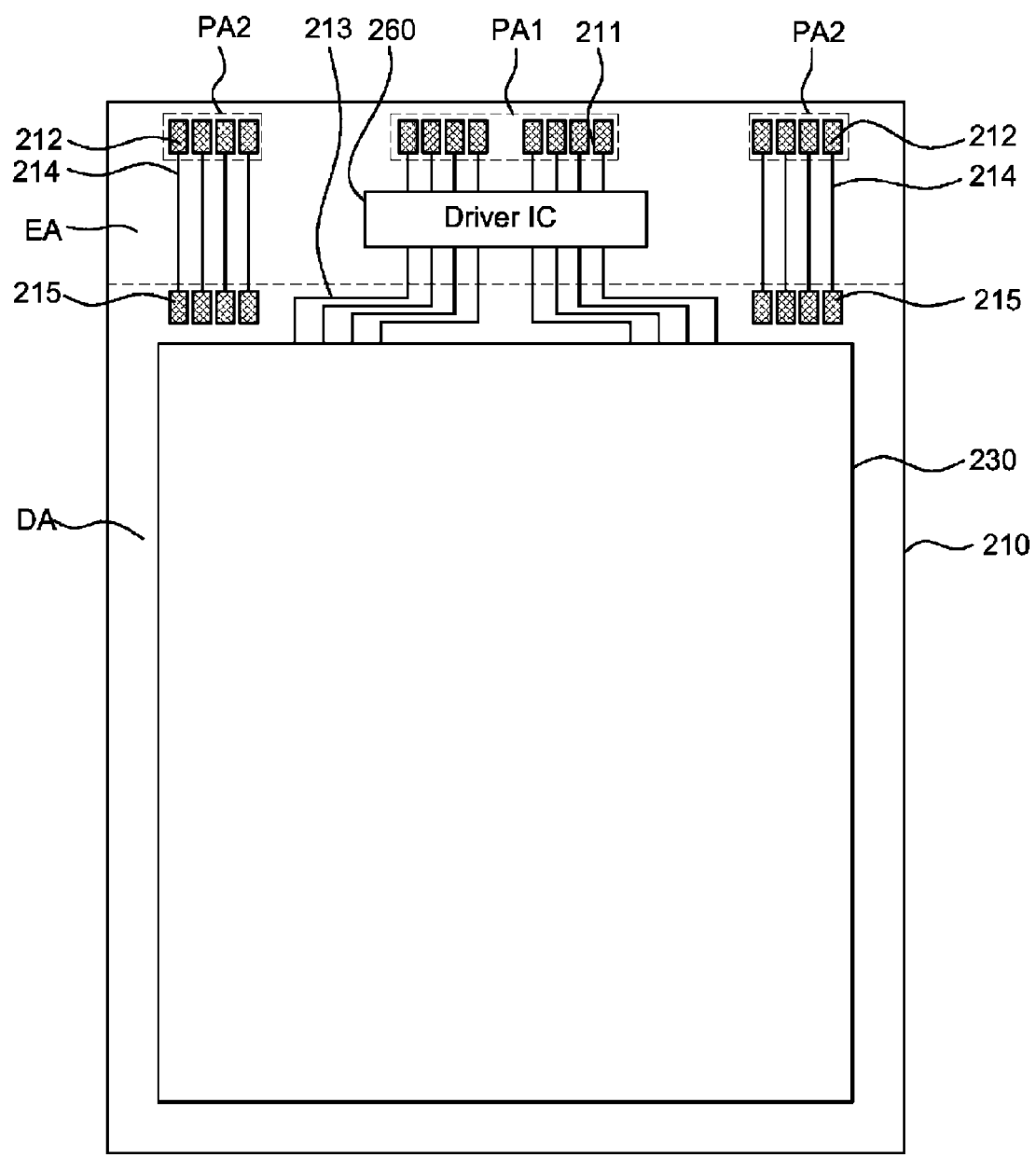
FIG. 2D is a schematic plane view provided to describe a lower substrate according to an exemplary embodiment of the present invention.

FIG. 2D is a schematic plane view provided to describe a lower substrate according to an exemplary embodiment of the present invention. FIG. 2D illustrates only the first pad 211, the second pad 212, a first line 213, a second line 214, a lower connecting pad 215, the display element 230, and the driver integrated circuit 260 among the components disposed on the lower substrate 210.

As illustrated in FIG. 2A, FIG. 2B, and FIG. 2D, the lower substrate 210 may include a device area DA and an exposure area EA. In the touch screen-integrated display device 200, the device area DA accommodates various components configured to display images, and the display element 230 and the touch sensing element 240 are disposed in the device area DA. The exposure area EA extends from one side of the device area DA, and is not covered by the upper substrate 220. However, the exposure EA is exposed, whereas the lower substrate 210 and the upper substrate 220 are bonded to each other. The exposure area EA may include a first pad area PA1 where the first pad 211 is disposed and a second pad area PA2 where the second pad 212 is disposed. Here, a pad refers to terminals or connectors that allow electrical connections between different components. In the single touch screen-integrated display device 200, a single first pad area PA1 and two second pad areas PA2 may be provided. As illustrated in FIG. 2A and FIG. 2D, while the two second pad areas PA2 are disposed on the corners of the lower substrate 210, the first pad area PA1 may be disposed between the two second pad areas PA2. However, alternative locations and configurations other than those depicted fall within the technical scope of the exemplary embodiments described herein.

The first pad 211 is disposed in the first pad area PA1 of the lower substrate 210. The first pad 211, which has a special structure and particular configuration, is electrically connected with the display element 230 through the first line 213 and is also electrically connected with a first pad connecting unit 273 of the flexible printed circuit board 270. The first pad 211 is configured to carry, transfer, or otherwise used to transmit signals for displaying an image to the display element 230. The first pad 211 may be made of a highly conductive material such as metals including aluminum (Al), aluminum (Al) alloys, copper (Cu), copper (Cu) alloys, molybdenum (Mo), and chromium (Cr).

The second pad 212, which has a special structure and particular configuration, is disposed in the second pad area PA2 of the lower substrate 210. The second pad 212 is electrically connected with the touch sensing element 240 through the second line 214, the lower connecting pad 215, and the upper connecting pad 225, and is also electrically connected with the second pad connecting unit 274 of the flexible printed circuit board 270. The second pad 212 is configured to carry, transfer, or otherwise used to transmit signals for sensing a touch to the touch sensing element 240. As illustrated in FIG. 2A, FIG. 2C, and FIG. 2D, if the two second pad areas PA2 are disposed in the exposure area EA of the lower substrate 210, driving signals (Tx signals) for driving the touch sensing element 240 may be transferred (transmitted) to the second pad 212 that is disposed in one of the two second pad areas PA2. Sensing signals (Rx signals) from the touch sensing element 240 may be transferred (transmitted) to the second pad 212 disposed in the other second pad area PA2. The second pad 212 is also made of a highly conductive material and may be made of the same material as the first pad 211.

The upper substrate 220 is disposed so as to face the lower substrate 210 and is configured to accommodate or support various components of the touch screen-integrated display device 200. The upper substrate 220 is disposed so as to correspond to the device area DA of the lower substrate 210. That is, as illustrated in FIG. 2A and FIG. 2B, the upper substrate 220 is disposed so as to face all portions of the lower substrate 210, except for the exposure area EA of the lower substrate 210. Thus, a size of the upper substrate 220 may be the same as a size of the lower substrate 210 less the size of the exposure area EA. The upper substrate 220 may be made of a flexible material and may be made of the same material as that of the lower substrate 210.

Figure 2E:
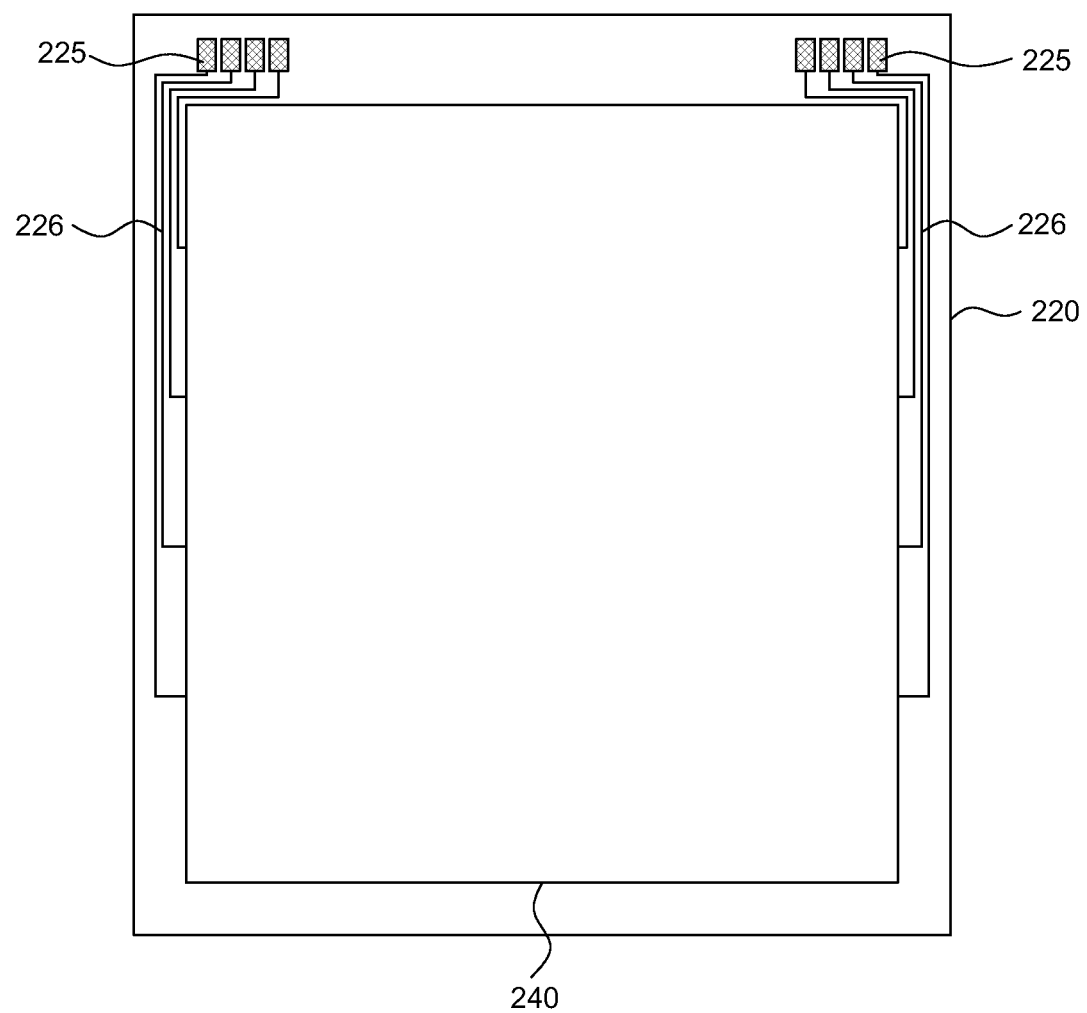
FIG. 2E is a schematic plane view provided to describe an upper substrate according to an exemplary embodiment of the present invention.

FIG. 2E is a schematic plane view provided to describe an upper substrate according to an exemplary embodiment of the present invention. FIG. 2E illustrates only the upper connecting pad 225, a third line 226, and the touch sensing element 240 among the components disposed on the upper substrate 220.

The upper connecting pad 225 is disposed so as to be vertically overlapped (or otherwise stacked) with the lower connecting pad 215 (FIG. 2D) and is electrically connected with the lower connecting pad 215 through a conductive bonding material such as an ACF (Anisotropic Conductive Film), an ACA (Anisotropic Conductive Adhesive), an ACP (Anisotropic Conductive Paste), and the like.

The display element 230 is disposed in the device area DA of the lower substrate 210. The display element 230 is electrically connected with the driver integrated circuit 260, the first pad 211, and the flexible printed circuit board 270 through the first line 213. The display element 230 is used in displaying images via the touch screen-integrated display device 200. The display element may be composed of one or more elements, for example, such as a liquid crystal element or an organic light emitting element, that is configured to transmit or emit light such that images can be output.

The touch sensing element 240 is disposed on the upper substrate 220. The touch sensing element 240 is disposed so as to correspond to the device area DA of the lower substrate 210. The touch sensing element 240 is electrically connected with the upper connecting pad 225 and the lower connecting pad 215 through the third line 226 and is also electrically connected with the second pad 212, the flexible printed circuit board 270, and the touch integrated circuit 280 through the second line 214. The touch sensing element 240 recognizes touch operations of a user and may include multiple touch driving electrodes Tx and multiple touch sensing electrodes Rx.

The bonding layer 250 is disposed between the lower substrate 210 and the upper substrate 220. The bonding layer 250 is interposed between the lower substrate 210 and the upper substrate 220 so as to bond together the lower substrate 210 and the upper substrate 220. The bonding layer 250 may be made of various materials, for example, such as bonding materials including an OCA (Optical Clear Adhesive), an OCR (Optical Clear Resin), and the like.

The driver integrated circuit 260 is disposed in the exposure area EA of the lower substrate 210. The driver integrated circuit 260 provides or transmits signals used for displaying images to the display element 230. To be more specific, the driver integrated circuit 260 generates driving signals such as gate signals and data signals using multiple control signals and RGB signals received from an external printed circuit board (PCB) and transmits the generated driving signals to the display element 230. If the driver integrated circuit 260 is directly disposed on the lower substrate 210, the driver integrated circuit 260 may have a finer pitch and thus the total thickness of the touch screen-integrated display device may be minimal. The driver integrated circuit 260 may be mounted on the lower substrate 210 using a conductive bonding material such as an ACF (Anisotropic Conductive Film).

The flexible printed circuit board 270 has a special structure and particular configuration to allow connection with both the first pad 211 and the second pad 212 of the lower substrate 210. The flexible printed circuit board 270 electrically connects the first pad 211 and the second pad 212 with an external printed circuit board in which a timing controller is disposed. The flexible printed circuit board 270 is made of a flexible material, for example, plastic such as polyimide. During assembly, the flexible printed circuit board 270 may be subjected to a pressure and heat while being disposed in the exposure area EA of the lower substrate 210, and then it can be attached to the first pad 211 and the second pad 212 of the lower substrate 210.

Figure 2F:
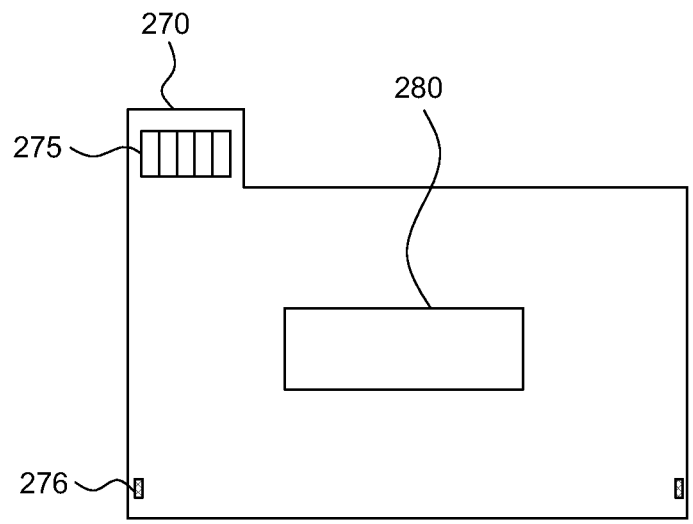
FIG. 2F provides schematic plane views to describe a flexible printed circuit board according to an exemplary embodiment of the present invention.
Figure 2F:
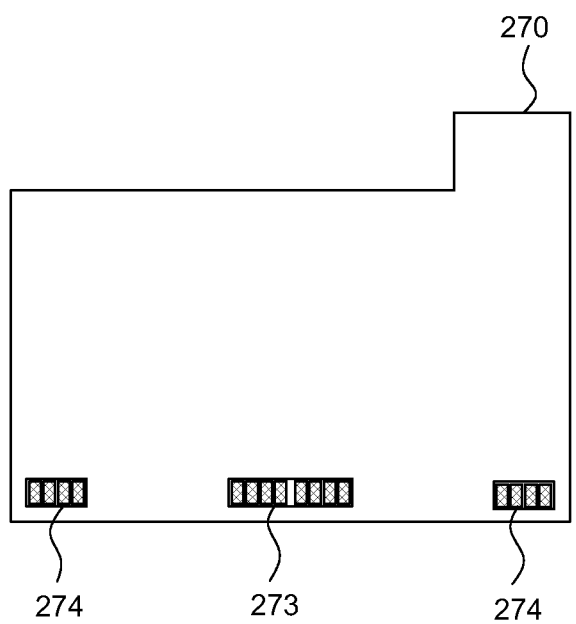

FIG. 2F provides schematic plane views to describe a flexible printed circuit board 270 according to an exemplary embodiment of the present invention. FIG. 2F(a) illustrates a top (front) surface of the flexible printed circuit board 270, and FIG. 2F(b) illustrates a bottom (rear) surface of the flexible printed circuit board 270.

Referring to FIGS. 2F(a) and 2F(b), the flexible printed circuit board 270 can include the first pad connecting unit 273, the second pad connecting unit 274, a connector 275, and an alignment mark 276.

The first pad connecting unit 273 is electrically connected with the first pad 211, and the second pad connecting unit 274 is electrically connected with the second pad 212. The first pad connecting unit 273 is disposed so as to face the first pad 211, and the second pad connecting unit 274 is disposed so as to face the second pad 212. Thus, two second pad connecting units 274 are disposed on the corners of the flexible printed circuit board 270, and a single first pad connecting unit 273 is disposed between the two second pad connecting units 274.

The connector 275 is disposed at one end of the flexible printed circuit board 270 opposite the first and second pad connecting units so as to connect the flexible printed circuit board 270 with the external printed circuit board on which a timing controller is disposed. As illustrated in FIG. 2F(a), on the single flexible printed circuit board 270, there may be disposed a single connector 275.

The alignment mark 276 serves as a reference when attaching the flexible printed circuit board 270 onto the lower substrate 210. A process operator or automated robot can be used to determine whether the flexible printed circuit board 270 is accurately aligned on the lower substrate 210 based upon whether the alignment mark 276 is at a predetermined position. As illustrated in FIG. 2A and FIG. 2F, if one side of the flexible printed circuit board 270 adjacent a boundary line between the exposure area EA and the device area DA is found to be straight, two alignment marks 276 may be seen on both corners of the flexible printed circuit board 270. Proper alignment can be determined and achieved in various other ways.

The touch integrated circuit 280 is arranged on the flexible printed circuit board 270. The touch integrated circuit 280 generates and transmits driving signals to the touch sensing element 240 and determines whether a touch operation is input or determines a touch position by using sensing signals from the touch sensing element 240. The touch integrated circuit 280 may be mounted on the flexible printed circuit board 270 using a conductive bonding material such as an ACF (Anisotropic Conductive Film).

In the touch screen-integrated display device 200 according to an exemplary embodiment of the present invention, the single flexible printed circuit board 270 is attached to an entirety of the first pad 211 which is connected with the display element 230, and the second pad 212 which is connected with the touch sensing element 240 on the upper substrate.

In the touch screen-integrated display device 200 according to an exemplary embodiment of the present invention, in order to connect the external printed circuit board with the lower substrate 210, only the single connector 275 that has a special structure and particular configuration disposed on the flexible printed circuit board 270 needs to be connected with the external printed circuit board. Thus, a process for bonding the connector 275 can be simplified.

Figure 3A:
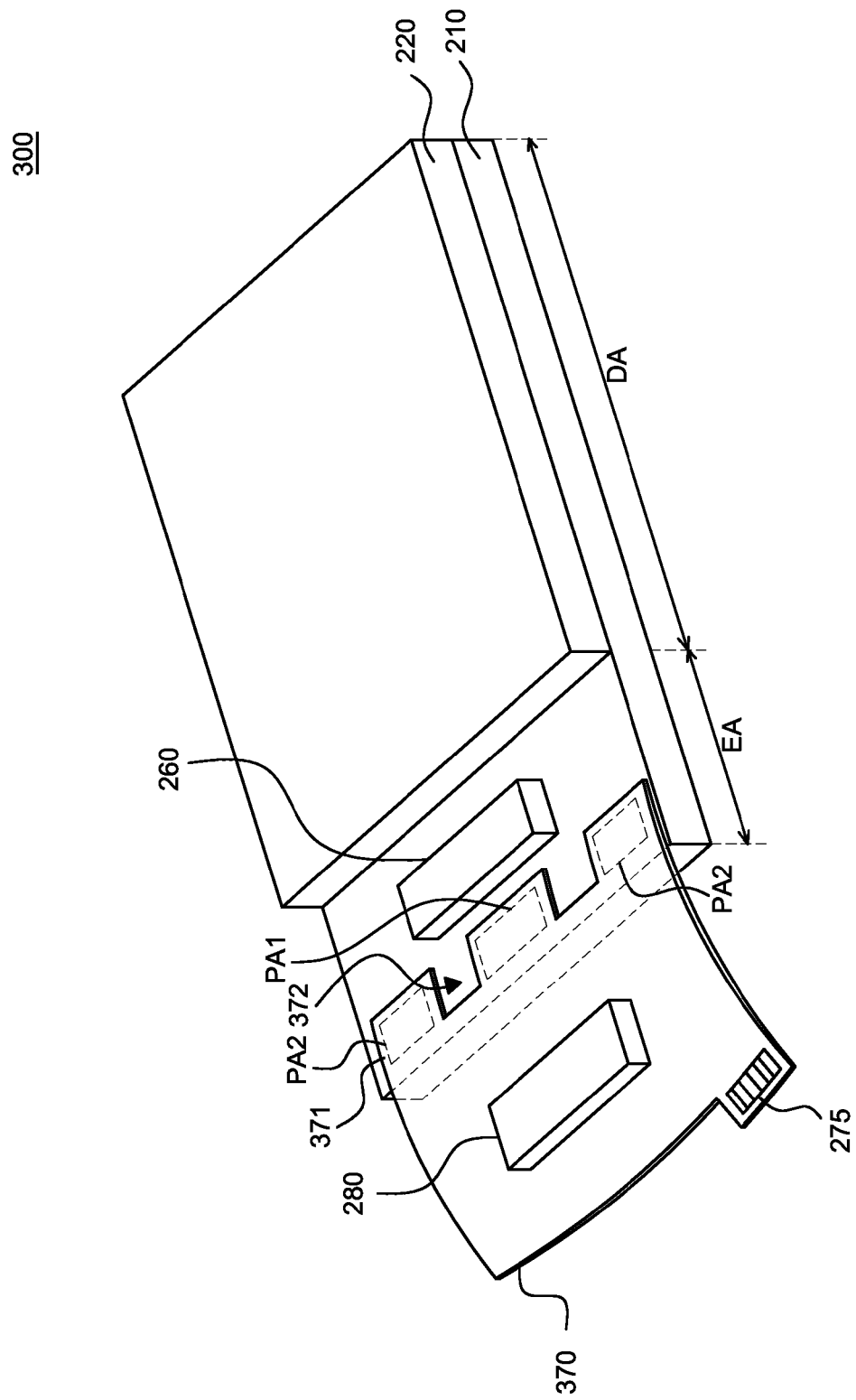
FIG. 3A is a perspective view provided to describe a touch screen-integrated display device according to another exemplary embodiment of the present invention.
Figure 3B:
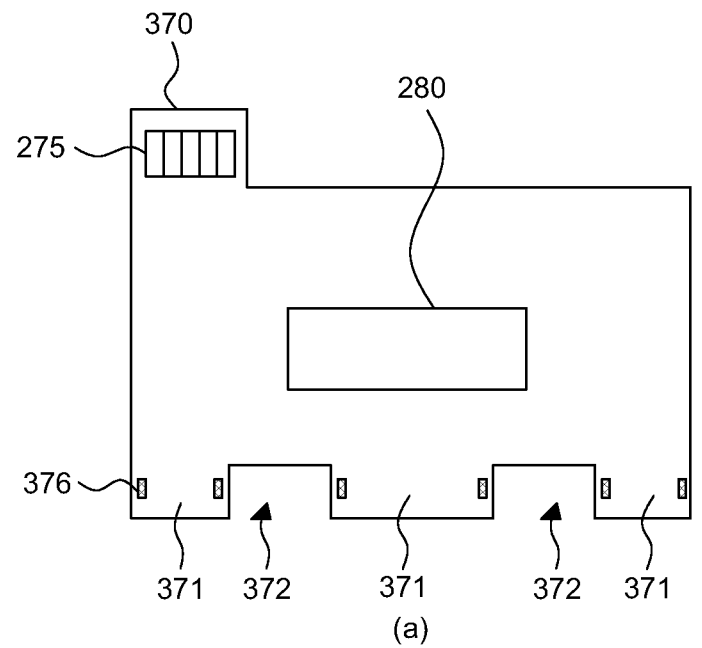
FIG. 3B provides plane views to describe a flexible printed circuit board according to another exemplary embodiment of the present invention.
Figure 3B:
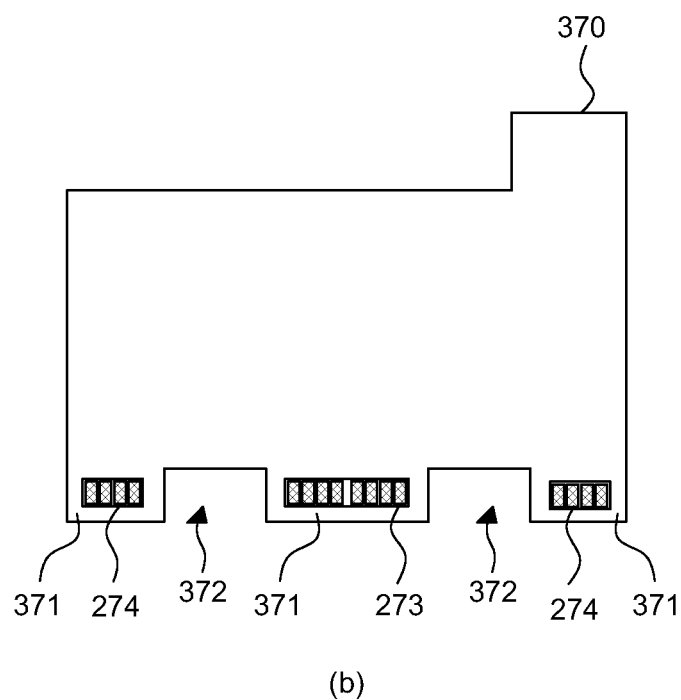

FIG. 3A is a perspective view provided to describe a touch screen-integrated display device according to another exemplary embodiment of the present invention. FIG. 3B provides plane views to describe a flexible printed circuit board according to another exemplary embodiment of the present invention.

A touch screen-integrated display device 300 illustrated in FIG. 3A can be substantially the same as the touch screen-integrated display device 200 illustrated in FIG. 2A except that a flexible printed circuit board 370 includes a plurality of protruding portions 371. Here, it can be clearly understood that such protruding portions can have various configurations and dimensions, and can be labelled or named in a variety of ways. The first pad connecting unit 273 or the second pad connecting unit 274 is disposed on each of the plurality of protruding portions 371, and an alignment mark 376 is disposed on each of the plurality of protruding portions 371. Thus, redundant explanations thereof will be omitted.

The flexible printed circuit board 370 according to this exemplary embodiment of the present invention includes the plurality of protruding portions 371 and the multiple concave portions 372 created from the plurality of protruding portions in the flexible printed circuit board 370. As illustrated in FIG. 3A and FIG. 3B, the plurality of protruding portions 371 refers to a relatively protruding portion of the flexible printed circuit board 370, and the concave portion 372 refers to a relatively non-protruding portion. The plurality of protruding portions 371 and the concave portions 372 are formed at one side of the flexible printed circuit board 370 that is adjacent to a boundary line between the exposure area EA and the device area DA on the lower substrate.

Referring to FIG. 3A and FIG. 3B, the first pad connecting unit 273 or the second pad connecting unit 274 is disposed on each of the plurality of protruding portions 371. Thus, the first pad connecting unit 273 and the second pad connecting unit 274 separate from each other on the lower substrate 210.

The alignment mark 376 (or other type of indicators that facilitate the manufacturing or processing procedures) may be disposed on each of the plurality of protruding portions 371. For example, as illustrated in FIG. 3B, the alignment marks 376 may be respectively disposed on both corners of each protruding portion 371. A process operator or automated robot can check an alignment status of each of the first pad connecting unit 273 and the second pad connecting unit 274 by referring to the alignment marks 376 disposed on the plurality of protruding portions 371.

Generally, while each of the first and second pad connecting units of a flexible printed circuit board and each of the first and second pads are aligned, pressure and heat are applied to the first pad connecting unit, the second pad connecting unit, and the first pad. The second pad and the flexible printed circuit board are attached to a lower substrate. While heat is applied, the flexible printed circuit board may thermally expand, which may cause misalignment of each of the first and second pad connecting units and each of the first and second pads.

However, in the touch screen-integrated display device 300 according to this exemplary embodiment of the present invention, the first pad connecting unit 273 or the second pad connecting unit 274 is disposed on each of the plurality of protruding portions 371 formed at one side of the flexible printed circuit board 370. Thus, while heat is applied in order to attach the flexible printed circuit board 370 to the lower substrate 210, the protruding portions 371 may individually expand given the space provided from the concave (notch) portions 372. Therefore, misalignment of each of the first pad connecting unit 273 and the second pad connecting unit 274 and each of the first pad 211 and the second pad 212 can be minimized due to such protruding portions 371. Further, when the first pad connecting unit 273 or the second pad connecting unit 274 is disposed on each of the plurality of protruding portions 371, the separate alignment marks 376 are also disposed. Thus, when attaching the flexible printed circuit board 370 to the lower substrate 210, the process operator or robotic machinery can readily control an alignment process or check the alignment status of the first pad connecting unit 273 and the second pad connecting unit 274.

Figure 4A:
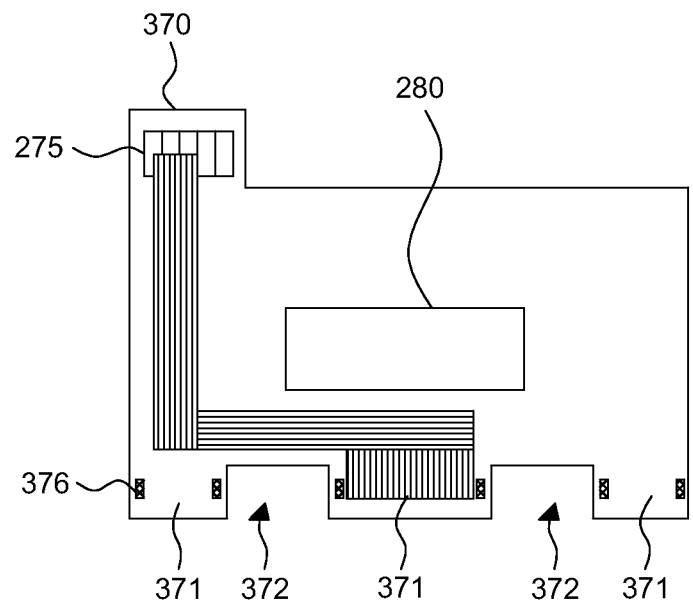
FIGS. 4A and 4B provide plane views to describe a touch screen-integrated display device according to another exemplary embodiment of the present invention.
Figure 4B:
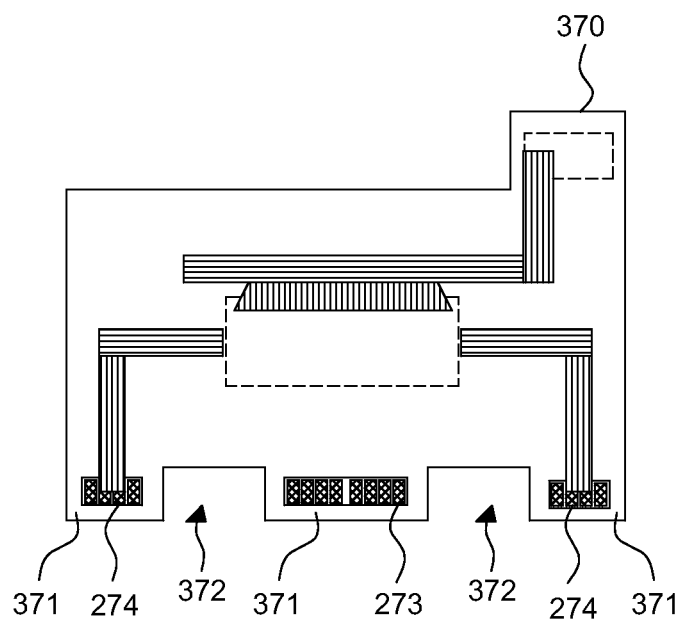

FIGS. 4A and 4B provide plane views to describe a touch screen-integrated display device according to another embodiment of the present invention. In FIGS. 4A and 4B, the wiring connections of the flexible printed circuit board 370 are described.

As illustrated in FIG. 4A, the flexible printed circuit board 370 has an upper surface configured to accommodate a first type of interface. A corner portion of the flexible printed circuit board 370 has a dual-purpose connection terminal 275 that supports transferring of display related signals and touch related signals. An edge of the flexible printed circuit board 370 opposite the corner portion has a plurality of protruding portions 371. The edge may include at least one notch portion between the central connection terminal and each of the pair of the connection terminals. The first type of interface on the upper surface may be a display wiring having one end attached to the dual-purpose connection terminal 275, and an opposing end attached to a central connection terminal 273 located at one of the plurality of protruding portions 371. A touch integrated circuit 280 may be on the upper surface and connected to the touch wiring. Similar to the descriptions in FIGS. 3A and 3B, a pair of connection terminals 274 and a central connection terminal 273 are disposed on the plurality of protruding portions 371.

As illustrated in FIG. 4B, the flexible printed circuit board 370 has a lower surface having touch wiring serving as a second type of interface. The touch wiring has one end attached to the dual-purpose connection terminal 275 and an opposing end attached to the pair of connection terminals 274.

The pair of connection terminals 274 and the central connection terminal 273 are configured to be connected to a touch screen-integrated display device, and the dual-purpose connection terminal 275 is configured to be connected to circuits that support the touch screen-integrated display device.

Although the exemplary embodiments of the present invention have been described in detail with reference to the accompanying drawings, the present invention is not limited thereto and may be embodied in many different forms without departing from the technical concepts. Therefore, the exemplary embodiments of the present invention are provided for illustrative purposes only but not intended to limit the technical concept of the present invention. The scope of the technical concept of the present invention is not limited thereto. The protective scope of the present invention should be construed based on the following claims, and all the technical concepts in the equivalent scope thereof should be construed as falling within the scope of the present invention.

What is claimed:

1. A flexible member electrically connecting a display panel and a touch panel to an external circuit, comprising:
   a first connecting portion located at a first surface of the flexible member, having
      a first pad connecting unit, which is a display pad connecting unit, configured to connect with a displaying element in the display panel, and
      a second pad connecting unit, which is a touch pad connecting unit, configured to connect with a touch sensing element in the touch panel, wherein the first and second pad connecting units are both located on the first surface of the flexible member;
   a second connecting portion located at a second surface of the flexible member opposite to the first connecting portion, having a single connector configured to connect with the external circuit to control at least one of the displaying element and the touch sensing element; and
   a touch integrated circuit on the second surface of the flexible member, wherein the touch integrated circuit transmits a driving signal to the touch sensing element.

2. The flexible member of claim 1, wherein the first connecting portion comprises two second pad connecting units and one first pad connecting unit located between the two second pad connecting units.

3. The flexible member of claim 1, further comprising at least one alignment mark on the second surface of the flexible member, wherein the at least one alignment mark is used for aligning the flexible member on a lower substrate of the display panel.

4. The flexible member of claim 2, further comprising a plurality of protruding portions extending from an edge of the flexible member opposite the single connector and separated from each other, wherein the at least two second pad connecting units and the one first pad connecting unit are located on the plurality of protruding portions.

5. The flexible member of claim 1, further comprising a mounting portion located between the first connecting portion and the second connecting portion, capable of accommodating the touch integrated circuit.

6. The flexible member of claim 1, wherein the single connector is connected to the first and second pad connecting units via wire lines.

7. The flexible member of claim 6, wherein the wire lines comprise:
   a first group of wire lines connecting the first pad connecting unit with the single connector and located on the second surface of the flexible member; and
   a second group of wire lines connecting the second pad connecting unit with the single connector and located on the first surface of the flexible member.

8. The flexible member of claim 7, wherein the single connector has an array of pins through which signals for driving the displaying element and the touch element are transferred.

9. The flexible member of claim 8, wherein the array of pins comprise:
   a first group of pins through which signals for the displaying element are transferred; and
   a second group of pins through which signals for the touch sensing element are transferred,
   wherein the first group of pins are located adjacent the second group of pins on the second surface of the flexible member.

10. A touch screen-integrated display device, comprising:
a lower substrate defined to have a device area where an image is displayed and an exposure area, wherein a first pad area and a second pad area are on a lower substrate in the exposure area;
an upper substrate facing and on the lower substrate only in the display area;
a display element on the lower substrate in the display area, wherein a signal for displaying the image is transmitted to the display element by the first pad area, and wherein the display element is electrically connected to the first pad area;
a touch sensing element on the upper substrate in the device area, the touch sensing element electrically connected to the second pad area on the lower substrate, wherein a touch sensing signal is transmitted by the second pad area to the touch sensing element;
a driver integrated circuit located in the exposure area of the lower substrate, wherein the driver integrated circuit is connected to the display element and provides driving signals to the driving element;
a single flexible printed circuit board connected to the first pad area and the second pad area of the lower substrate, the single flexible printed circuit board comprising:
a first connecting portion located at a first surface of the flexible printed circuit board, having:
a display pad connecting unit configured to connect with the display element on the lower substrate, and
a touch pad connecting unit configured to connect with the touch sensing element on the upper substrate;
a second connecting portion located at a second surface of the flexible printed circuit board opposite to the first connecting portion, having a single connector configured to connect with an external circuit to control at least one of the display element and the touch sensing element; and
a touch integrated circuit on the second surface of the flexible printed circuit board, wherein the touch integrated circuit transmits a driving signal to the touch sensing element.

11. The touch screen-integrated display device of claim 10, wherein the first connecting portion of the flexible printed circuit board comprises two touch pad connecting units and one display pad connecting unit located between the two touch pad connecting units.

12. The touch screen-integrated display device of claim 10, further comprising at least one alignment mark on the second surface of the flexible printed circuit board, wherein the at least one alignment mark aligns the flexible printed circuit board on the lower substrate of the display device.

13. The touch screen-integrated display device of claim 11, further comprising a plurality of protruding portions extending from an edge of the flexible printed circuit board opposite the single connector and separated from each other, wherein the at least two touch pad connecting units and the one display pad connecting units are located on the plurality of protruding portions.

14. The touch screen-integrated display device of claim 10, wherein the single connector of the flexible printed circuit board is connected to the display pad connecting unit and the touch pad connecting unit via wire lines.

15. The touch screen-integrated display device of claim 14, wherein the wire lines comprise:
a first group of wire lines connecting the display pad connecting unit with the single connector of the flexible printed circuit board and located in the upper area of the flexible printed circuit board; and
a second group of wire lines connecting the touch pad connecting unit with the single connector and located in a lower area of the flexible printed circuit board.

16. The touch screen-integrated display device of claim 10, further comprising a bonding layer between the upper and lower substrates to bond surfaces of the upper substrate and lower substrate.

17. A connector, comprising:
a plate-shaped body of a flexible material, the plate-shaped body having a upper surface configured to accommodate a first type of interface and a lower surface configured to accommodate a second type of interface, wherein the plate-shaped body has one edge having a corner portion having a dual-purpose connection terminal that supports transferring of display related signals and touch related signals, and wherein the plate-shaped body has an opposing edge having a pair of connection terminals and a central connection terminal located between the pair of connection terminals;
display wiring located on the upper surface of the plate-shaped body and serving as said first type of interface, the display wiring having one end attached to the dual-purpose connection terminal, and an opposing end attached to the central connection terminal; and
touch wiring located on the lower surface of the plate-shaped body and serving as said second type of interface, the touch wiring having one end attached to the dual-purpose connection terminal, and opposing ends attached to the pair of connection terminals.

18. The connector of claim 17, further comprising:
a touch integrated circuit on the upper surface and connected to the touch wiring.

19. The connector of claim 18, wherein the opposing edge includes at least one notch portion between the central connection terminal and each of the pair of the connection terminals.

20. The connector of claim 19, wherein the pair of connection terminals and the central connection terminal are configured to be connected to a touch screen-integrated display device, and the dual-purpose connection terminal is configured to be connected to circuits that support the touch screen-integrated display device.

* * * * *